June 30, 1970 — K. A. BLENKARN — 3,517,517

ENCAPSULATED CABLE FOR MARINE USE

Filed Sept. 19, 1968 — 3 Sheets-Sheet 1

INVENTOR.
KENNETH A. BLENKARN
BY *John D. Gassett*
ATTORNEY

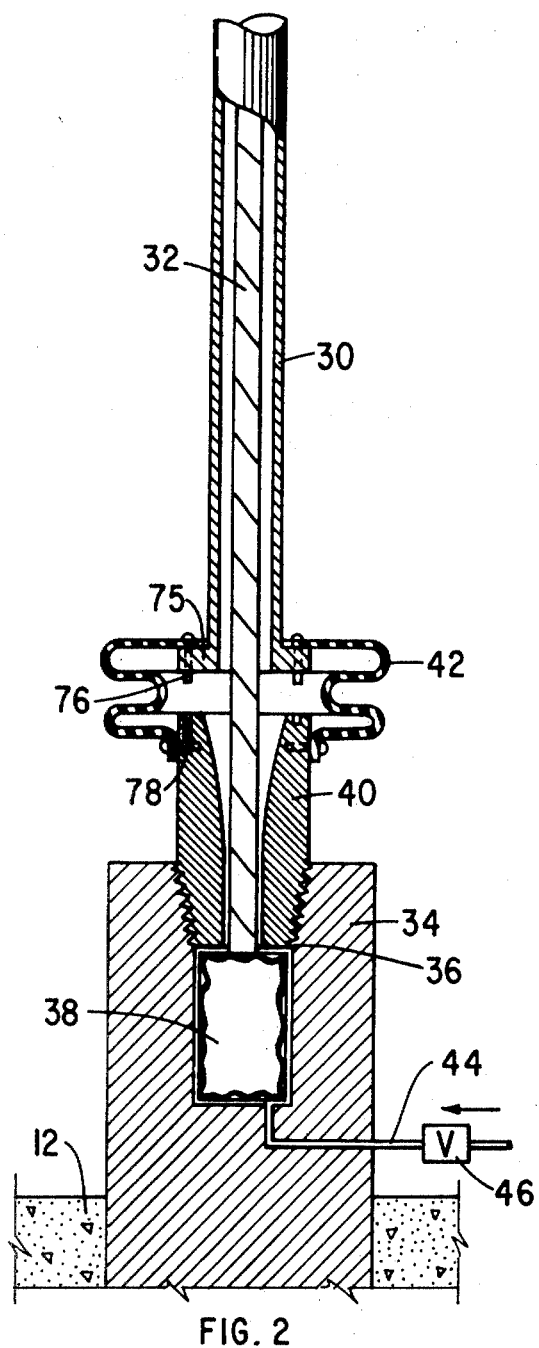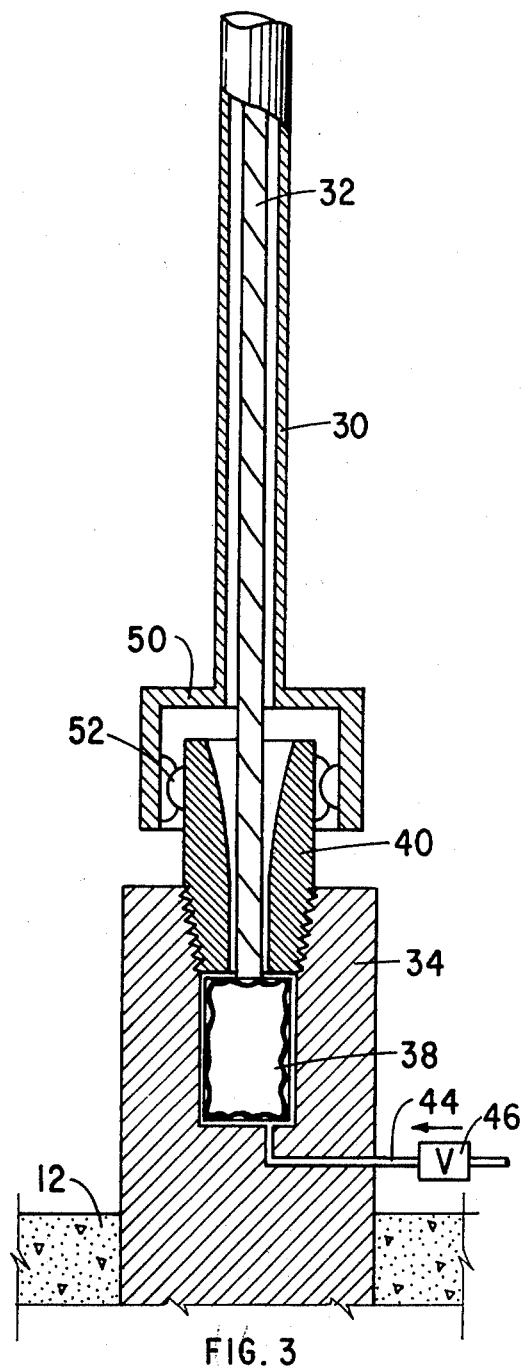

United States Patent Office 3,517,517
Patented June 30, 1970

---

3,517,517
ENCAPSULATED CABLE FOR MARINE USE
Kenneth A. Blenkarn, Tulsa, Okla., assignor to Pan American Petroleum Corporation, Tulsa, Okla., a corporation of Delaware
Filed Sept. 19, 1968, Ser. No. 760,895
Int. Cl. B63b 35/44; E02b 17/00
U.S. Cl. 61—46.5                    11 Claims

ABSTRACT OF THE DISCLOSURE

This invention relates to a system for mooring a floating structure to the ocean floor. Load-bearing steel cables are preserved within non-load-bearing metal pipes. The cable connects the floating structure to anchors at the base of the body of water. Special terminations are provided which limit the curvature of the flexing of the cable. A non-corrosive fluid is contained within the encapsulating pipe.

BACKGROUND OF THE INVENTION

Field of the invention

This invention is concerned with the mooring of floating structures. More particularly, the invention is concerned with non-load-bearing encapsulating pipe which surrounds load-bearing steel cables which hold the floating structure to the anchor.

Background of the invention

A common means for mooring floating objects in the ocean is the use of steel wire rope or cables connecting the floating object to an anchor in the ocean floor. For short term use, this proves quite satisfactory. However, in situations where long life is required, e.g., vertically moored platforms used in oil well drilling and production, there is substantial questioning about the long-term integrity of the steel wire rope. This is because the many strands of the steel cable are each individually subject to corrosive attack. One might cover cables with plastic or rubber coatings. However, at the present stage of technology, these type coverings have not proved to be of long life.

SUMMARY OF THE INVENTION

This invention concerns the protection of steel wire rope or cables which are used to connect a floating structure to anchor at the bottom of the body of water. The steel cables are placed within a non-load-bearing metallic tube. Special end terminations are used with the encapsulating tube. This is to limit the angular motion experienced by the cable at its terminations. These end terminations can be accomplished by placing the end of the cables inside a bell which limits the curvature of flexing of the cable. The end trumpet terminations are connected to the encapsulating pipe or tube to exclude the corrosive environment, e.g., ocean water, from the space adjacent to the cable and the trumpet. It is preferred that the interior of the encapsulating tube and the trumpet be filled with a protective fluid to prevent corrosion and wear.

The principal object of this invention is to provide protection to a metallic or steel wire rope which is used to anchor a floating structure to the ocean floor. This and various other objects of the invention will become apparent from the following description of the embodiments shown in the accompanying drawings.

BRIEF DESCRIPTION OF THE DRAWINGS

FIG. 2 illustrates one form of end-trumpet terminations for the encapsulating tube;

FIG. 3 illustrates another embodiment of end terminations of the encapsulating tube;

DESCRIPTION OF THE PREFERRED EMBODIMENT

Figure 1:
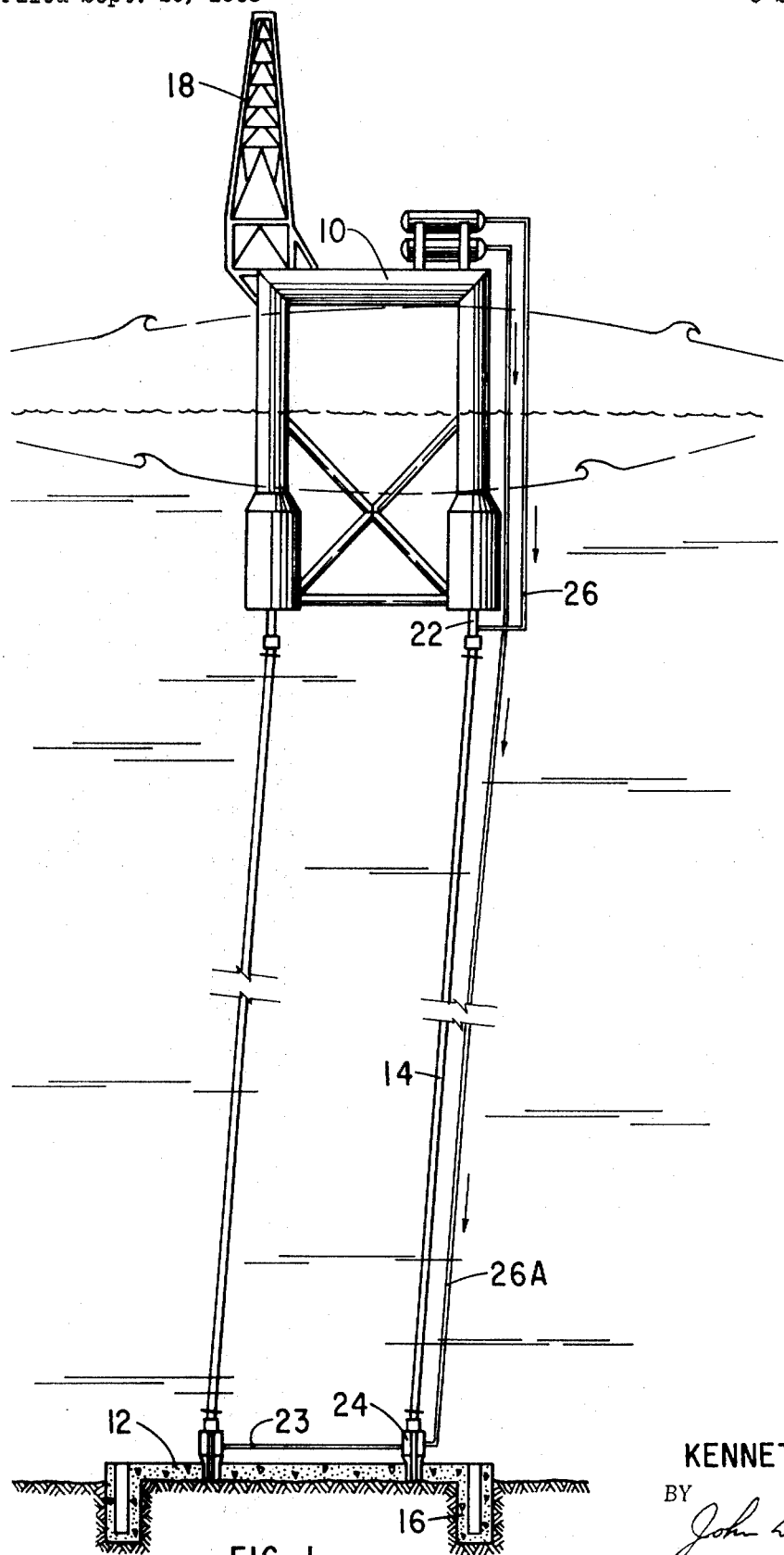
FIG. 1 illustrates a floating structure held in place by load-bearing cables contained in encapsulating tubes.

Attention is directed to FIG. 1 which illustrates a floating platform 10 connected to anchor 12 by elongated members 14. Anchor members 12 can be any type anchors which are secured to the floor of the ocean such as by piles 16. Platform 10 can be any type platform having a derrick 18 located thereon used in the drilling of wells, for example. Elongated members 14 include flexible load-bearing steel cables surrounded by encapsulating metallic tubes and end terminations 22 at the upper end near the platform and at 24 at the lower end. Details of the various embodiments of these end terminations 22 and 24 will be discussed in connection with FIGS. 2, 3 and 4. They are used to prevent or limit the flexure of the steel cables. A non-corrosive fluid may be provided for the interior of the encapsulating tube through conduit 26 which terminates on top of the platform 10 and by conduit 26A at the lower end of the elongated members 14.

Attention is now directed to FIG. 2 which illustrates one embodiment of the end termination trumpet or tube. Shown in FIG. 2 is a load-bearing cable 32 and non-load-bearing encapsulating tube 30. Cable 32 and tube 30 are metallic, preferably steel. A base means 34 for securing the cable is provided and is attached and made an integral part of the anchor base 12. The upper part of base 34 is provided with a bore which opens to the upper end in a flared out manner. The lower portion of the bore 36 is to receive cable socket 38 which is normally merely a large piece of metal to which the cable 32 is attached. Just above cable socket 38 is a trumpet or bell means 40. This trumpet or bell means 40 is connected to base 34 and such as, for example, by a threaded connection between the two. The trumpet holds the cable socket 38 in base 34. The end trumpet 40 is connected with the encapsulating tube 30 by some flexible device or other means to exclude the corrosive environment from the space adjacent to the cable 32 and the trumpet. One way of achieving this is to connect the trumpet 40 with the encapsulating metal pipe 30 by means of a boot or flexible joint 42. This flexible boot 42 can be made as a metallic bellows or it may be made of rubber. If it is made of rubber, it may require periodic replacements; however, replacement of the boot 42 is far easier than replacement of the entire covering system for a long cable. The lower end of tube 30 is provided with shoulder 75 having downwardly pointing teeth 76. These teeth mate with upwardly facing slots 78 in the upper face of trumpet 40 so that torque can be transmitted between the two.

As an aid in further protecting the cable 32 in the embodiment in FIG. 2, it is desired to place a protective fluid within the encapsulating tube 30. Such a fluid can be clean oil, for example. It could be injected at the surface through conduit 26, for example, and purged out through passage 44 having check valve 46 and within base 34. Alternatively, passage 44 of one base 34 can be connected through conduit 23, as shown in FIG. 1, to a corresponding passage 44 of a second base 36. Then protective fluid can be circulated down the interior of one encapsulating pipe, out passage 44, through conduit 23 and back up a second encapsulating pipe.

The angular motion, which may be experienced by cable termination, is very much related to the motion experienced by a floating object. These motions can be characterized as follows: (a) a very large number of cycles of small amplitude and (b) a relatively small number of large excursions occasioned by storm waves.

The bending of the cable can be limited by a trumpet whose inner surface is a constant radius aperture. In mathematic terms, this can be characterized as being a square curve. However, because of the nature of the cyclic loading, it may be preferable to avoid wear on that portion of the cable which would take a large number of cycles. One possibility is to provide a trumpet which has a cubic curve for its profile. This means that that portion of the cable undergoing a large number of cycles can be bent very slightly. That portion of the cable being subjected to only a limited number of cycles could tolerate a very much larger curvature.

Attention is next directed to the embodiment of FIG. 3. Shown thereon is a flexible cable 32 enclosed by a metallic encapsulating pipe 30. Similarly as FIG. 2 shows, FIG. 3 also contains the base 34, cable socket 38 and trumpet 40. The main difference between the embodiments of FIG. 2 and FIG. 3 is the connection between the encapsulating pipe 30 and the trumpet 40. In FIG. 3, a mechanical cap or cover 50 is provided at the lower end of encapsulating pipe 30 and extends downwardly over trumpet 40. Trumpet 40 and mechanical cover 50 are connected by splines 52. It is noted that in this particular embodiment there is no seal at this point. But in this system, I use protective fluids of different density; for example, protective fluids heavier than the surrounding water are placed in the trumpet and protective fluids lighter than water are placed in the encapsulating tube above the mechanical cover 50. Typical heavier protective fluids include fresh water solutions of sodium or potassium carbonate and suitable lighter protective fluids include an inhibited oil. During operations the lighter fluid can be injected through a connection such as conduit 26 at the surface and the heavier fluid injected through conduit 44. In this case, check valve 46 is replaced or its action reversed.

Figure 4:
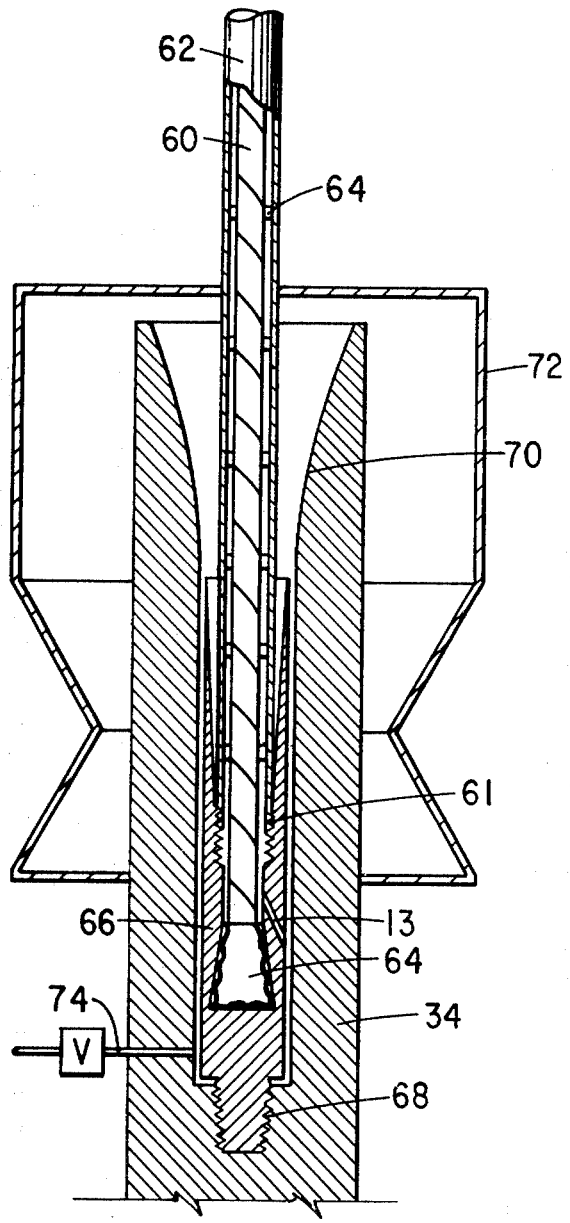
FIG. 4 still another embodiment of the end terminations of the encapsulating tube.

In some applications it may be desirable to avoid the sealing problem referred to above. One approach to the solution of this problem is to establish an end trumpet for the encapsulating pipe as well as for the cable. In regards to the base of the trumpet for the encapsulating pipe, the same consideration described above regarding the cable trumpet applies. Attention is now directed to FIG. 4 which shows one means by which the encapsulating pipe is placed within a curvature limiting trumpet. Shown thereon is a cable 60 placed within an encapsulating steel tube 62. The lower end of encapsulating tube 62 is provided with cable centralizers 64. Cable 60 is attached by any suitable means such as a cable socket 64, to an inner section 66 of the pipe trumpet. This inner section 66 is connected to base member 34 as by threads 68. The upper end of base member 34 is flared outwardly to form the outer section 70 of the pipe trumpet. A mechanical cover 72 is provided over the end of trumpet section 70 to exclude marine growth and other debris from the trumpet. In this system it is desirable to place the heavy protection fluid within the trumpet. This can be done through fluid supply connection 74 in the lower end of the base member 34. Supply connection 74 can be connected to a supply source at the surface.

There are various ways in which the system described in this invention can be installed. For example, in the embodiment of FIG. 2, the cable, the encapsulating pipe, and the trumpet 40 are lowered to the approximate position by using guidelines or other means well known in the art but not shown. Then encapsulating tube 30 is lowered so that its teeth 76 engage slots 78 on the upper side of trumpet 40. Then rotating pipe 30 attaches the trumpet 40 to the base 34. This securely holds the cable socket in the base plate 40. A similar method can be used with the embodiment of FIG. 3.

In FIG. 4 the lower end of pipe 62 is connected at point 61 to the inner section 66. Rotation of pipe 62 connects the lower end of inner section 66 to base 34. Other well-known latch mechanical devices can be used.

While the above embodiments have been shown with a great deal of detail, various modifications thereof can be made without departing from the scope of the invention.

I claim:
1. A system for mooring a structure floating on a body of water to the floor of said body of water, which comprises:
 an anchor in the floor of said body of water;
 a first flexible load-carrying line between said floating structure and said anchor;
 a first non-load-carrying encapsulating tube enclosing and surrounding said flexible line so as to exclude the surrounding water from contacting said load-carrying flexible line, there being a first space between said first load-carrying line and said first non-load-carrying encapsulating tube.
2. A system as defined in claim 1 including
 a second flexible load-carrying line between said structure and said anchor;
 a second non-load-carrying encapsulating tube enclosing and surrounding said second flexible load-carrying line, there being a second space between said second load-carrying line and said second non-load-carrying encapsulating tube; and
 conduit means connecting said first space near the lower end of said first encapsulating tube and said second space near the lower end of said second encapsulating tube whereby a protecting fluid can be circulated down one such space and up the other.
3. An apparatus as defined in claim 1 including
 a base member attached to said anchor;
 means to attach said flexible cable to said base member;
 a trumpet termination placed about the lower end of said flexible line and attached to said base, said trumpet means limiting the curvature of flexing of the cable at the end point; and
 a boot surrounding said flexible line and connecting the lower end of said encapsulating tube with the upper end of said trumpet.
4. A system as defined in claim 3 including a fluid non-corrosive to said line and filling the space between said line and said encapsulating tube.
5. An apparatus as defined in claim 3 including
 a passage means through said base establishing communication between the lower interior of said trumpet and the exterior of said base.
6. An apparatus as defined in claim 3 including:
 teeth means on the lower end of said encapsulating tube and mating slots on the upper end of said trumpet so that upon engagement, torque can be transmitted therethrough.
7. An apparatus as defined in claim 1 including:
 a base member attached to said anchor means:
 a trumpet means secured to said base means, said flexible line extending through said trumpet means to a point of attachment to said base means;
 a cap means attached to the lower end of said encapsulating tube and extending downwardly and over the exterior of said trumpet means;
 a non-corrosive fluid lighter than water in the space between said encapsulating tube and said flexible line and a non-corrosive fluid heavier than said body of water and filling that part of the interior of said trumpet not occupied by said flexible line.
8. An apparatus as defined in claim 7 including
 spline means between the interior of said cap means and the exterior of said trumpet.
9. An apparatus as defined in claim 8 in which said trumpet has a profile which is a cubic curve.
10. An apparatus as defined in claim 8 including
 conduit means for directing said heavier fluid into said trumpet.

11. An apparatus as defined in claim 1 including:
cable line centralizers within the lower end of said encapsulating tube;
a base means connected to said anchor means, said base means having a vertical bore extending from the top to an intermediate point;
means attaching said cable to said base means;
an inner section of a pipe trumpet surrounding the lower end of said encapsulating tube, said inner section being within the vertical bore of said base means and terminating at a position therein;
the upper portion of a vertical bore of said base means being flared outwardly in a shape forming an outer section of a pipe trumpet;
a mechanical cover attached to the lower end of said encapsulating tube and covering the upper end of said base means;
a protective fluid lighter than water in said encapsulating tube and a protective fluid heavier than water within the hollow portion of said inner and outer section of said pipe trumpet;
a passage means between the lower, inner end of said encapsulating tube and the exterior of said base means.

References Cited

UNITED STATES PATENTS

| | | | |
|---|---|---|---|
| 2,606,003 | 8/1952 | McNeill | 175—7 |
| 3,142,343 | 7/1964 | Otteman et al. | 175—7 |
| 3,154,039 | 10/1964 | Knapp | 61—46.5 X |

JACOB SHAPIRO, Primary Examiner

U.S. Cl. X.R.

166—.5, .6; 175—7